Feb. 21, 1950 J. H. ROGERS 2,498,581
EXTENSIBLE AND RETRACTABLE SHIELD
FOR CAMERA LENS AND FILTERS
Filed March 11, 1947 3 Sheets-Sheet 3
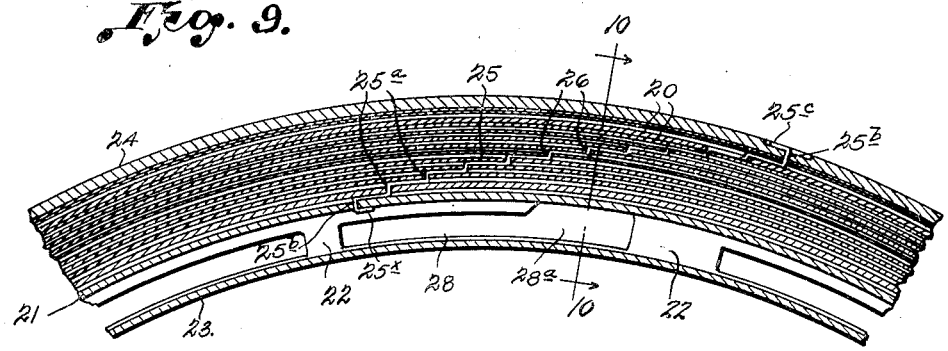
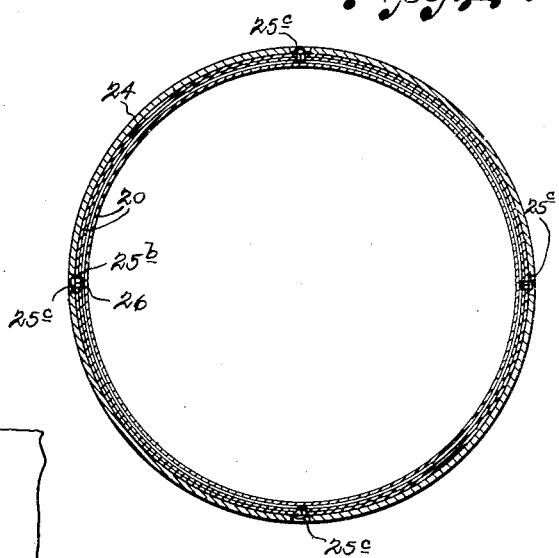
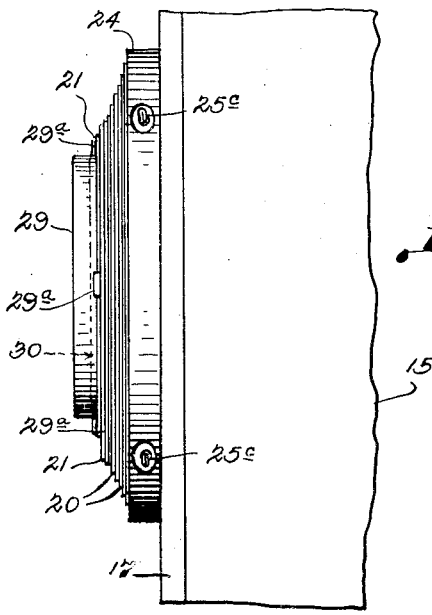
INVENTOR.
JOSEPH ROGERS
BY
Eugene E. Stevens
Attorney.

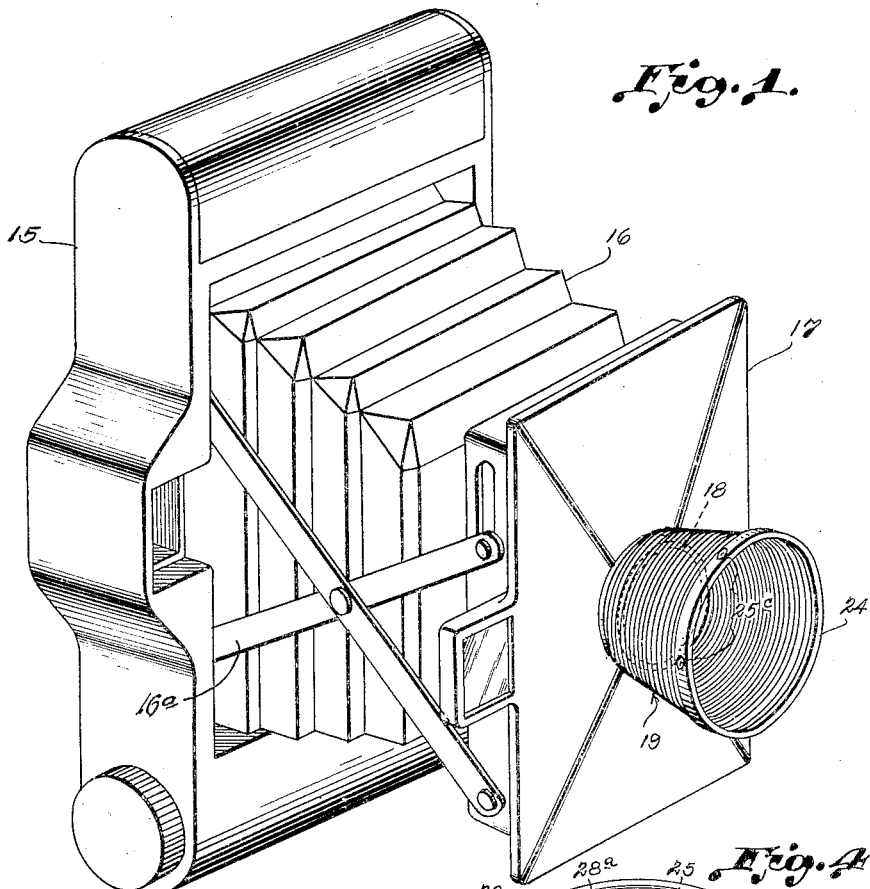
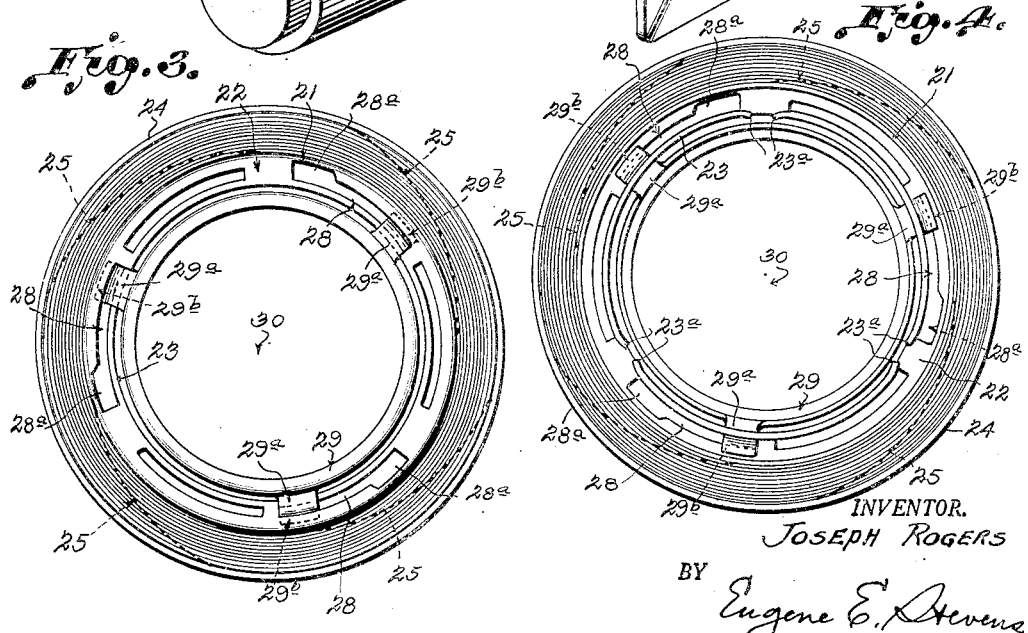

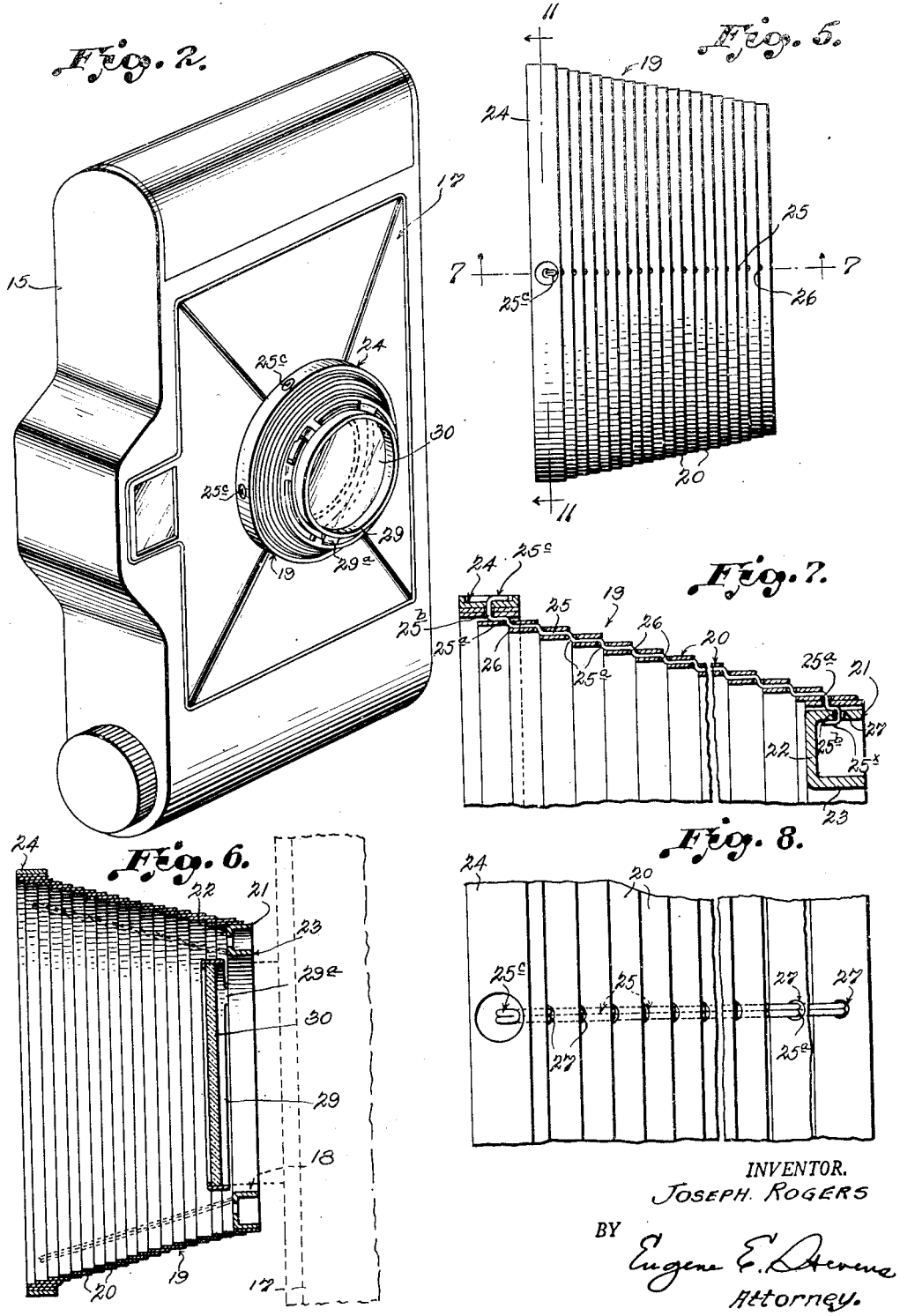

Patented Feb. 21, 1950

2,498,581

UNITED STATES PATENT OFFICE 2,498,581

EXTENSIBLE AND RETRACTABLE SHIELD FOR CAMERA LENSES AND FILTERS

Joseph H. Rogers, Hyattsville, Md.

Application March 11, 1947, Serial No. 733,883

4 Claims. (Cl. 88—1)

My invention relates to improvements in lens guards for cameras or the like with particular reference to such as are designed to keep from the lens at least certain light rays when a picture is being taken.

Briefly and generally stated, the invention has for one of its primary objects to provide a novel and improved lens shield which is adapted for detachable mounting on the lens barrel of a camera and which is so formed that it can be collapsed against the lens board when not in use.

Another object of the invention resides in the provision of a lens shield which has detachably associated therewith a light filter.

More specifically, the invention contemplates a lens shield for cameras which comprises a body formed from a spiral strip and which incorporates novel means for not only maintaining convolutions of the strip in contiguous overlapping relationship when the shield is in operative position, but which means also serves to maintain the shield against accidental shifting toward or from operative position.

Still another object of the invention resides in the provision of a frusto-conical collapsible light shield for camera lenses which, when in inoperative position, is adapted to lie flush, or substantially flush, with the lens board of the camera about the lens barrel.

Additionally, a lens shield embodying my invention lends itself to economical manufacture, is long-lived, can be readily attached or detached from a camera, and is highly efficient in practical use.

The foregoing and other incidental objects of the invention, it will be readily understood and appreciated by those skilled in the art from a reading of the following descriptive matter in connection with the now preferred embodiment of my invention which is illustrated in the accompany drawings.

Although but one form of the invention is dealt with herein, it should be emphasized that my inventive concept is susceptible of many other mechanical expressions within the spirit and scope of the subject matter claimed hereinafter.

In the drawings, wherein the same reference characters have been employed to designate the same parts throughout the several views, Fig. 1 is a perspective view of a well-known type of folding camera whose lens barrel has attached thereto a light filter embodying my invention, said shield being shown in its extended or operative position;

Fig. 2 is a perspective view of the camera in its closed or carrying position and illustrating the lens shield collapsed against the lens board so as to be out of the way;

Fig. 3 is a rear elevational view of the shield removed from the lens barrel and collapsed as in Fig. 2;

Fig. 4 is a front elevational view of the collapsed shield indicated in Fig. 3;

Fig. 5 is a side elevational view of the shield in its extended or operative position shown in Fig. 1;

Fig. 6 is a longitudinal sectional view through the shield, extended, as in Fig. 5;

Fig. 7 is an enlarged fragmentary sectional view taken on the line 7—7 of Fig. 5;

Fig. 8 is an enlarged fragmentary plan view, partly broken, and looking down on the disclosure of Fig. 7;

Fig. 9 is a fragmentary longitudinal sectional view through the shield collapsed with its convolutions in alignment;

Fig. 10 is a cross sectional view taken on the line 10—10 of Fig. 9;

Fig. 11 is a cross sectional view through the outer end of the extended shield and taken on the line 11—11 of Fig. 5; and Fig. 12 is a side elevational view of the collapsed shield in association with the lens board.

Referring to the drawings by reference characters, numeral 15 indicates the body of the camera, which is characterized by the outwardly movable lens board 17, having the bellows connection 16 with the body and guided in its movement by conventional lazy tongs 16a.

The lens (not shown) is carried in the conventional barrel 18 which has its outer end protruding from the face of the lens board 17, as indicated in Figs. 1 and 2.

Turning to Fig. 1, the frusto-conical lens shade is generally designated by reference character 19 and comprehends the flat helical spring metal strip which provides the overlapping convolutions 20, best indicated in Figs 5 and 6.

The innermost convolution 20 is secured to the outer surface of an annulus 21 in a manner to be presently explained, while the outermost convolution 20 carries the finishing ring 24.

Figs. 6 and 7 disclose the smaller ring or annulus 21 as having within it a concentric ring 23 of smaller diameter, which is connected to the ring 21 by the web portion 22.

As indicated in Fig. 6, the inner ring 23 serves as the means for mounting the light shade 19 on the lens barrel 18. In carrying out this phase of the invention, I provide the rear edge of the ring 23 with gaps and circumferential slits providing the inwardly bent tongues 23a which are adapted to bear against the outer surface of the barrel 18 to frictionally hold the shade mounting annulus or ring 23 in place.

In order to maintain the convolutions 21 in contiguous engagement regardless of whether the shade is in the operative position disclosed in Fig. 1 or in the inoperative position disclosed in Fig. 2, I provide at circumferentially spaced points the preferably doubled strands of spring metal wire 25.

In the illustrated example of the invention I employ four sets of said doubled wire strands, as best indicated in Figs. 3 and 4. These sets of strands 25 are spaced approximately ninety degrees apart, as indicated.

The specific application of the wires 25 is best illustrated in Figs. 7 and 8 wherein it will be noted that the inner end of each strand provides the pivot 25b extending transversely through the hole 27 in the outer annulus 21 of the mounting ring 23, the inner terminal of the strands 25 being bent laterally as at 25x into flat contact with the inner surface of annulus 21, whereby to provide an anchor for the inner end of the wire.

Fig. 7 illustrates the wire 25 as extending forwardly from the aforementioned pivot 25b in flat contact with the outer surface of annulus 21 to the lateral pivot portion 25a, which extends through aligned holes 26 in the overlapped portions of the convolution 20 which defines the inner end of the shade. This wire 25 connects overlapped portions of convolutions 20 and through portion 25b pivotally connects same to annulus 21.

Still referring to Fig. 7, it will be noted that the wire 25 has, at intervals equal to half the width of the respective convolutions 20, a laterally off-set bearing portion 25a extending through apertures 26 in the convolutions 20. Thus, the wire 25, 25a serves to pivotally connect the overlapped convolutions 20 in addition to maintaining them in contiguous overlapped relationship.

From the pivot hole 26 in the convolution 20, which is adjacent the outermost one, the twin wire strand 25 makes flat contact therewith, as in the case of the inwardly located convolution, and then provides the outwardly turned bearing portion 25b which extends through and connects the overlapped ends of the outer convolution, said bearing portion 25b also extending through a hole in the outer ring 25. The bight portion of the wire 25 is bent laterally against the surface of a recess 24a in the exterior of ring 24 to provide an anchor 25c, as indicated in Figs. 5, 7 and 8.

Figs. 2, 3 and 9 best illustrate the web 22 which connects the convolution-carrying annulus 21 with the mounting annulus 23, as having a series of circumferentially spaced bayonet slots 28. These bayonet slots 28 have the entry openings 28a at corresponding ends for the off-set terminals 29b of the radially extending fingers 29a of the ring 29.

This ring 29 is adapted, as best indicated in Fig. 6, to carry a light filter 30. When the ring 29 is coupled to the web portion 22, the filter 30 will be disposed in operative position in advance of the lens-carrying barrel 18.

As will be understood from an inspection of Figs. 3, 4 and 6, the intermediate portions of the filter ring tongues 29a ride on the web portion 22 while the off-set terminals 29b of said tongues engage the under-surface of said web portion outwardly of the tongue-receiving bayonet slots 28. It is a simple matter to install or remove the light filter 29, 30. A slight twist of the filter-carrying ring 29 serves to bring the tongue terminals 29b to a position under the web portion 22 or to a position in registry with the bayonet slot enlargements 28a, at which latter position the ring, of course, can be removed.

The threading of the spring wire 25 successively through the overlapped convolutions 20 and pivoting the ends of said wires as at 25b to the rings or annuli 21, 24, provides a connected loop 20 at each end of the device and maintains intermediate convolutions in contiguous and at least partially overlapping relationship at all times as aforesaid. But further and beyond this, each wire 25 constitutes what might be termed a lever which is reinforced at its bearing connections 25a, 26 by the thus provided attachment to the convolutions 20. Thus, when the shade is expanded to the operative position of Figs. 1 and 6, the wire strands 25, reinforced at spaced points in the direction of their length will prevent the shade from being collapsed by pushing against either of its ends in the direction of its axis. To collapse the shade from the Fig. 1 position to the Fig. 2 position it is necessary to twist the outer annulus 24 in a counter-clockwise direction as viewed in Fig. 1. When this is done the strands 25 perform a concerted lever-like function causing all convolutions to partake of relative circumferential movement until the convolutions are aligned with one another, as indicated in Fig. 10. Continuation of said counter-clockwise turning movement of the outer ring 24 results in reverse lever action of the wire strands 25 with the result that the shade 19 is coned inwardly until the inner edge of the outer ring 24 bears against the face of the lens board 17 about the lens barrel 18.

To actuate the shade from the inoperative Fig. 2 position to the operative Fig. 1 position, it is only necessary to twist the ring 24 clockwise.

When the wire levers 25 are disposed in circumferential alignment as in Fig. 10, there is comparatively little resistance to twisting movement, and it seems possible to compress or expand the unit by mere axial pressure. However, when the wires 25 are disposed diagonally of the axis of the shade, a distinct twisting movement of ring 24 is required to extend or retract the device.

By reason of the peculiar and unique functioning of the spring wire levers 25 the shade will be maintained in the collapsed position of Fig. 2 and, likewise, in the operative Fig. 1 position against inadvertent shifting, this being true because a deliberate twist of ring 24 is required to effect such shifting.

When the shade 19 is moved from the Fig. 1 position to the Fig. 2 position, or vice versa, the respective intermediate convolutions 20 simultaneously pivot at their apertures 26 on the associated bearing portions 25a of the wires, and at the same time, of course, the end bearings 25b of the wires pivot in the associated bearing opening of the outer annulus 24 of the inner annulus 21, as the case may be. Thus, there is no buckling of the wires at any point and each section of wire between the pivot portions 26 simply bends slightly to conform to the curvature of the associated convolution 20. In other words, it is the relative stiffness of wires 25 which causes the device to function as described.

From the foregoing description taken in connection with the accompanying drawings it is believed that the construction and operation of my device will be readily understood and appreciated. The light filter 29, 30 provides a very convenient adjunct to the shade and may be left assembled with the latter when the shade is in the collapsed position of Fig. 2.

Having thus described my invention, what I claim is:

1. In a camera having a lens board and a lens-carrying barrel carried thereby, a mounting ring adapted to surround said barrel, an extensible and contractible lens shield formed of a coiled strip of resilient material having convolutions in overlapping telescoping engagement with each other, the convolution at the inner end of said shield fitting snugly about the mounting ring, a finishing ring fitting snugly about the convolution at the outer end of the shield, the convolutions of said strip being shiftable longitudinally and transversely of each other by turning movement of the finishing ring and being formed with openings, the openings of the inner and outer convolutions registering with openings in the mounting ring and the finishing ring, and strands of resilient wire extending between overlapping portions of the convolutions and having crimped portions pivotally passing through the openings in the said convolutions, the ends of the wire strands being formed with hooks passing through the registering openings of the convolutions and the said rings and pivotally mounting ends of the wire strands.

2. In a camera having a lens board and a lens-carrying barrel thereon, an extensible and retractable shield adapted to surround the barrel and comprising a body formed of a spirally extending strip of resilient material having overlapping convolutions movable circumferentially and longitudinally of the shield and formed with sets of openings, the openings of each set extending in a line circumferentially of the shield when the body is retracted and longitudinally of the shield when the body is extended, and separate strands of flexible metal material extending through corresponding openings of each set and between the overlapped convolutions said strands having portions bent to form pivots passing through the openings, the ends of the strands being pivotally anchored at inner and outer ends of the shield for swinging movement transversely of the shield during extension and retraction of the body.

3. In a camera having a lens board and a lens-carrying barrel thereon, a mounting ring adapted to surround said barrel and having inner and outer annular walls and a web connecting the said walls, said web being formed with bayonet slots extending circumferentially thereof, a filter having a rim provided with lugs engaged in the bayonet slots and detachably mounting the filter in front of the mounting ring, an extensible and retractable shield formed from a coiled strip of resilient material having its inner convolution fitting about the mounting ring and its outer convolution surrounded by a finishing ring, the said convolutions being overlapped and formed with openings, said finishing ring and said mounting ring being formed with openings registering with openings in the inner and outer convolutons of said strip, and resilient strands passing between the convolutions and having longitudinally spaced portions threaded through the openings thereof, said strands having end portions bent to form hooks passing through the registering openings of the resilient strip and the said rings and pivotally anchoring ends of the strands to the rings.

4. In a camera having a lens board and a lens-carrying barrel thereon, and extensible and retractable lens shield, comprising a mounting means attachable to said barrel, a body secured to said mounting means and having annular portions in telescoping engagement with each other, said portions being shiftably circumferentially of one another and inwardly and outwardly with respect to one another, said portions formed with circumferentially spaced openings and strands of stiff resilient material extending through corresponding openings of said respective portions, the outer end of said resilient material strands pivoted to the outer one of said telescoping portions and the other end of said respective strands pivoted to said mounting means, and said strands serving to control circumferential and inward and outward shifting of said sections relatively of one another when the outermost section is twisted circumferentially.

JOSEPH H. ROGERS.

REFERENCES CITED

The following references are of record in the file of this patent:

UNITED STATES PATENTS

| Number | Name | Date |
| --- | --- | --- |
| 1,283,963 | Takahashi | Nov. 5, 1918 |
| 1,848,879 | Halbasch | Mar. 8, 1932 |
| 1,971,434 | Trautmann | Aug. 28, 1934 |
| 2,093,237 | Dolecki | Sept. 14, 1937 |
| 2,143,125 | Headlee | Jan. 10, 1939 |
| 2,197,184 | Kemp | Apr. 16, 1940 |
| 2,241,596 | Guhl | May 13, 1941 |

FOREIGN PATENTS

| Number | Country | Date |
| --- | --- | --- |
| 20,706 | Great Britain | Sept. 18, 1907 |
| 25,036 | Great Britain | Nov. 3, 1913 |